Figure 1:
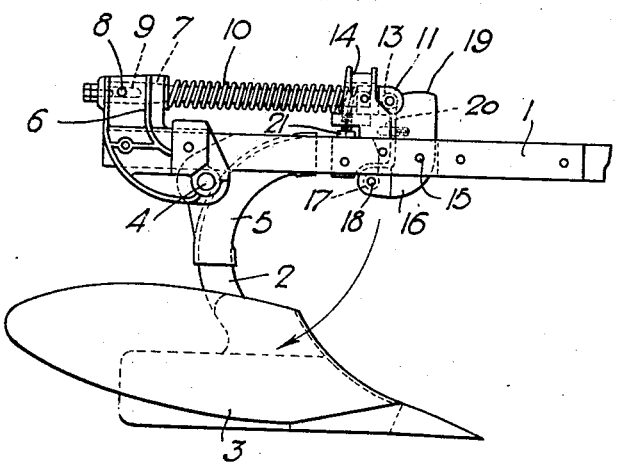

June 2, 1931.  O. A. K. PRINTZ  1,808,478

RELEASABLE PLOW

Filed Feb. 26, 1929

Inventor,
Oscar A. K. Printz,
By
Atty.

Patented June 2, 1931

1,808,478

UNITED STATES PATENT OFFICE

OSCAR ADOLF KRISTIAN PRINTZ, OF OVERUM, SWEDEN

RELEASABLE PLOW

Application filed February 26, 1929, Serial No. 342,830, and in Sweden April 13, 1928.

This invention relates to releasable plows, and particularly to improved means for preventing the plow bases from being damaged should they be subjected to heavy strains due to their encountering obstacles embedded in the ground. In order to avoid such damages it has been already proposed to pivotally mount the plow bases at the plow frame and subject them to the direct action of springs which in case of a light obstacle will allow the plow bases to turn aside or displace the obstacle, whereupon the springs will restore the plow bases to operative position while, in case of heavier obstacles, the plow bases will be released from the action of the springs and turned wholly out of operative position to be maintained there. In order that the springs may restore the plow bases to operative position after the plow bases have turned aside to avoid a light obstacle or displace same, the springs must be of high pressure and the restoration of a released plow base to operative position can, therefore, only be effected by means of appropriate tools, after the plow has been stopped.

According to another proposal the springs do not act directly on the pivotally mounted plow bases but act on the longer arms of two armed levers the shorter arms of which engage the free ends of the beams of the respective pivoted plow bases. This is with the object in view to permit a weak and sensible spring to be sufficient to maintain the plow base in operative position at normal drive. This design, however, presents the severe drawback that owing to the great sensibility of the springs the plow bases will have an irregular and rocking motion in the ground even at a slight variation of the resistance, as in encountering small stones and earth of varying hardness. Another drawback is due to the fact that the plow base after having turned fully aside to avoid a heavy obstacle can be again restored to operative position only after the driver has stopped the tractor and released the spring manually to allow it to again maintain the plow base in operative position.

The object of the present invention is to overcome the above said difficulties with the use of a strong spring capable of securing a steady motion of the plow base irrespective of light obstacles, whereas heavier obstacles, as stones embedded in the ground, will cause the spring action to be removed from the plow base already after a very little rotation thereof, rendering the plow base free to get out of the way of the obstacle.

Another object of the invention is to allow a restoration of the plow base to operative position after having passed the obstacle as well as an automatic connection of the released spring without requiring the driver's alighting from the tractor, nor any manipulations on the part of the driver.

Figure 2:
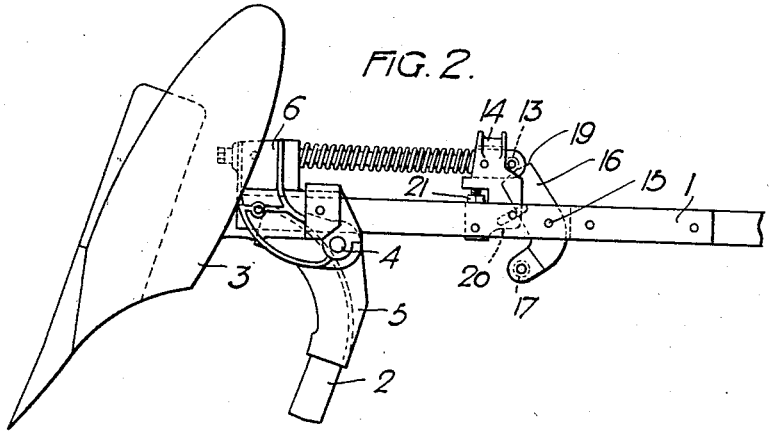
Figure 3:
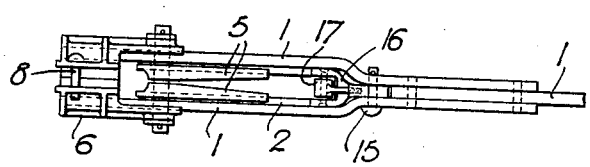

In the accompanying drawings, Fig. 1 is a side elevation of a pivotally mounted spring operated plow base in operative position, Fig. 2 is a side elevation of the plow base after it had turned aside to avoid an obstacle, and Fig. 3 is a top plan view of part of the plow frame together with the pivotally mounted beam, but with the spring removed.

Pivotally mounted in the plow frame 1 at 4 is the beam 2 with the plow base 3, said pivot 4 connecting the bearing members 5, 5 attached to the beam 2 with the bracket 6 attached to the plow frame 1. The free end of the beam is normally in engagement with the frame 1 and bears against the lower surface of a stop shoulder 21 situated at the upper edge of the frame and adjustable in vertical direction by means of a screw or the like. Slidably mounted in an aperture in the bracket 6 parallel to the frame 1 is a rod 7. A transversely extending bolt 8 secured to the bracket 6 and extending through a longitudinal slot 9 formed in the rod 7 serves to limit the longitudinal movement of the rod 7 relatively to the bracket. The rod 7 supports a spring 10 clamped between the bracket 6 and a fork shaped head 11 at the free end of the rod 7. Mounted on a transversely extending journal 12 carried by the fork head 11 is a roller 13. The fork head 11 is slidably mounted in a bracket 14 secured to the frame 1.

Pivotally mounted at 15 in the frame 1 in front of the free end of the beam 2 is a bell crank lever 16 the both arms of which are of substantially equal length. The lower end of the lever 16 is shaped as a fork carrying a roller by means of the pivot 18. The upper end of the lever 16 is shaped as a cam 19 the foremost part of which is cylindrical or substantially cylindrical with respect to the pivot 15. At its side facing the bracket 14 the upper arm 16 carries a projecting bolt or pin 20.

In the operative position of the plow base, as shown in Fig. 1, the roller 13 of the fork 11 is held by the action of the spring 10 against the rear straight edge of the upper arm of lever 16. Said pressure is transmitted through the roller 17 to the lower edge of the fore end of the beam 2 which is thus pressed upwards against the stop shoulder 21 thereby maintaining the beam with its plow base in operative position. Should there be any hinderance to the forward motion of the plow base sufficiently high to overcome the tension of spring 10 the plow base will turn rearwardly around the pivot 4 in the direction of the arrow. In this turning the fore end of the beam 2 is depressed causing the lever 16 to turn to the position shown in Fig. 2, whereas the fork 11 which is movable parallel to the frame 1 will be pressed rearwardly by the upper arm of the lever 16 while compressing the spring 10 until the cylindrical part of the cam 19 may freely pass below the roller 13, causing the displacement of the fork 11 and the rod 7 to cease. The lever 16 is still turned slightly until the free end of the beam 2 can freely pass the roller 17. During the said last mentioned rotation of the lever 16 the roller 13 will thus roll on the cylindrical part of the cam 19, and as there are two cylindrical surfaces 13 and 19 in contact with each other under pressure the pressure line will, of course, extend through the centres of these surfaces. The operative component of the spring pressure is, as a result, directed through the centre 15 and its torque will, consequently, be equal to 0. It is thus seen that the lever 16 and the beam 2 will move irrespective of the spring pressure during said last part of the movement. As a result, it is very easy to restore the plow base from the position shown in Fig. 2 to the operative position shown in Fig. 1, inasmuch as this restoration requires a backwards drive of the tractor only. As the point of the plow base is in engagement with the ground the plow base will be caused to turn back in said backwards drive. As the fore end of the beam 2 is now moved forwards and upwards it will pass the roller 17 and strike the projecting pin 20 thereby causing the lever 16 to turn back again. When this movement has continued so far as to allow the roller 13 to engage the straight rear edge of the upper arm of the lever 16, which will take place at the last stage of the movement, the spring pressure is again allowed to work to maintain the beam with the plow in operative position. As will appear from the foregoing, the movement of the parts of the spring mechanism is very little in disconnecting the plow base, with the result that a spring of very high tension may be used, so as to secure a steady motion of the plow base through the ground without causing an undue spring tension at the compression of the spring. With the above described design the driver need never alight from the tractor when driving against rigid obstacles embedded in the ground. He need only drive past the obstacle until the plow base is disconnected and then drive backward again a little to again connect the plow base automatically, whereupon the ploughing may be proceeded with.

By lowering the adjustable stop shoulder 21 the plow bases may be put more on their points. This is of importance in adjusting the plow prior to its use or after wear of the plow bases.

What I claim is:

1. In a plow, the combination with the plow frame, of a plow beam pivotally connected thereto, a plow base carried by said beam, a lever mounted in the plow frame to be engaged by the plow beam in the operative position of said plow base, sliding means in frictional engagement with said lever, a spring acting on said sliding means to press same against the lever to maintain said first mentioned engagement, and means to release the lever from the torque of the spring after a slight compression of the spring in order to permit the use of a powerful spring capable of securing a steady motion of the plow base irrespective of varying resistance in the ground.

2. In a plow, the combination with the plow frame, of a plow beam pivotally connected thereto, a plow base carried by said beam, a two-armed lever mounted in the plow frame, one arm of said lever being adapted to be engaged by the plow beam in the operative position of the plow base, a spring to engage the other arm of said lever to normally maintain said first mentioned engagement, a cam surface on said other arm of the lever to be engaged by the spring, said cam surface having such a shape as to release the lever from the torque action of the spring after a slight turning of the lever to compress the spring.

3. In a plow, the combination with the plow frame, of a plow beam pivotally connected thereto, a plow base carried by said beam, a two-armed lever mounted in the plow frame to engage the plow beam with one arm in the operative position of the plow base, a spring, a slidable member connected to said spring and normally engaging the other arm of the lever so as to cause the spring to be compressed in a turning of the lever due to the plow base encountering an obstacle, a cam surface on said other arm of the lever to be engaged by said sliding member, said cam surface having such a shape as to release the lever from the torque action of the spring, after having been turned to slightly compress the spring.

4. In a plow, the combination with the plow frame, of a plow beam pivotally connected thereto, a plow base carried by said beam, a two-armed lever mounted in the frame, one arm of said lever being adapted normally to engage the plow beam in the operative position of the plow base, a spring, a slidable member connected to said spring and normally engaging the other arm of said lever so as to cause the spring to be compressed in the turning of the lever from its normal position through a certain angle, and a cylindrical cam surface on said lever to engage said member in the continued turning of the lever so as to release the lever from the torque action of the spring after a slight compression of the spring due to said first mentioned turning.

5. In a plow, the combination with the plow frame, of a plow beam pivotally connected thereto, a plow base carried by said beam, a lever mounted in the plow frame to be engaged by the plow beam in the operative position of the plow base, sliding means in frictional engagement with said lever, a spring acting on said sliding means to press same against the lever to maintain said first mentioned engagement, means to release the lever from the torque action of the spring after a slight compression of the spring, and means on said lever to be operated by said plow in order automatically to restore the engagement between the plow beam and the lever by a backward drive of the plow when in released inoperative position.

6. In a plow, the combination with a plow frame, of a plow beam pivotally connected thereto, a plow base at one end of said plow beam, a two-armed lever pivoted to said frame, one arm of said lever being adapted to engage the other end of said beam to maintain the plow base in operative position, a spring, a slidable member connected to said spring to engage the other arm of said lever under the action of said spring, a cam surface on said other arm to engage said slidable member, said cam surface being so shaped as to release the lever from the torque action of the spring, after a slight compression of the spring due to a turning of the lever, and means on said lever to be engaged by the plow beam in its restoration to operative position after a release to turn the lever to a position to allow the spring to be brought into a position to again act on the lever, said engagement being accomplished by a backward drive of the plow.

In testimony whereof I have signed my name.

OSCAR ADOLF KRISTIAN PRINTZ.